JAMES E. HARVEY
MAX J. IRLAND
VICTOR L. LINDBERG
INVENTORS

BY John R. Faulkner
William E. Johnson
ATTORNEYS

United States Patent Office 3,554,722
Patented Jan. 12, 1971

3,554,722
METHOD OF MAKING A GLASS WINDOW STRUCTURE
James E. Harvey, Dearborn Heights, Max J. Irland, Dearborn, and Victor L. Lindberg, Northville, Mich., assignors to Ford Motor Company, Dearborn, Mich., a corporation of Delaware
Filed Aug. 30, 1968, Ser. No. 756,441
Int. Cl. C03b 18/02; B32b 17/00
U.S. Cl. 65—62
6 Claims

ABSTRACT OF THE DISCLOSURE

A method of making a glass window structure has the following steps. A ribbon of glass is manufactured by flowing molten glass out upon a molten bath to form the ribbon of glass. The ribbon is processed on the bath to obtain a taper therein across the width thereof. The glass ribbon is cut into a plurality of glass brackets, each of the brackets having a taper from a thick edge thereof to an opposing, thin edge thereof. Individual glass window structures are assembled from the brackets by positioning the thick edge of one of the brackets at one side of the frame of the window structure and thereafter positioning a second one of the brackets in the window frame so that the thick edge thereof is not in juxtaposition to the thick edge of the other bracket.

BACKGROUND OF THE INVENTION

In recent years the method of manufacturing flat glass has been improved by introduction of a glass manufacturing process in which molten glass is flowed out upon a molten bath of material and processed thereon so as to form a glass ribbon. This process is known as the float process of manufacturing glass. The glass ribbon produced by this process is particularly characterized both in its uniform thickness across the width thereof and in the superior fire-polished surface on the two principal surfaces of the glass ribbon. Because of the superior surface finish on the glass so manufactured, the glazing industry now utilizes this type of glass most extensively in constructing window structures.

Included in the window structures formed by the superior quality glass manufactured by the float process are thermal window assemblies. In such a structure, a pair of glass brackets are mounted in a spaced, generally parallel relationship in a window frame. The thermal window structure may be utilized in any building wherein it is desired to have a window area serving as the closure element between the exterior and interior of a building.

After some experience with the formation of thermal window structures utilizing the fire-polished float glass of uniform thickness, persons in the glass industry noted that fringes of color could be seen in the structures when the structures were viewed against a dull background under certain lighting conditions. The ringes of color gave a wood-grain or oil stain appearance in the structure to the viewer's eye. Fringes of a generally similar appearance have in the past been familiar to fabricators of thermal windows. The previously-known fringes could be made to disappear by inclining one glass bracket very slightly relative to the other. This remedy fails with some fringes especially those often associated with float glass, since the amount of inclination required to eliminate them is so great as to make the glass brackets conspicuously non-parallel, and moreover to exceed the space available in the frame of a thermal window structure.

In an attempt to eliminate these color fringes, glass panels of two different, but uniform thicknesses, were utilized to construct the window structure. Such a construction did eliminate the fringes produced by window structures employing two glass brackets of equal and uniform thickness. However, the manufacturer of the glass and the fabricators of the window structures were at a disadvantage when employing the two-thickness approach to eliminate the fringe problem. More particularly, the different thicknesses of glass would have to be made in two different runs by the glass manufacturer, and the fabricator of the window structure would have to store two different lots of glass with different thicknesses. As an alternative approach, the manufacturer could manufacture and store two different thicknesses of glass and subsequently intermingle alternate sheets of such glass in a shipment to the fabricator of the thermal window structure. Such a procedure, however, provided both a cost and a storage penalty to the glass manufacturer in that additional handling operations were necessary in order to store, package and ship intermingled thicknesses of glass to the fabricators.

SUMMARY OF THE INVENTION

This invention relates to a method of making glass window structures and, more particularly, to a method of making such structures which permits the construction of the window with float glass having superior surface characteristics but which eliminates the objectionable fringe pattern produced by the glazing of two brackets of float glass of uniform thickness in a window structure.

A method of making window structures in accordance with the teachings of this invention has the following steps. A ribbon of glass is manufactured by flowing the molten glass out upon a molten bath to form the ribbon and thereafter processing the ribbon on the bath in such a manner that the ribbon has a taper therein across the width thereof. The glass ribbon is cut into at least a pair of glass brackets, each of the glass brackets having a taper from a thick edge thereof to an opposing, thin edge thereof. An individual window glass structure is then assembled from the pair of brackets by positioning the thick edge of one of the brackets at one side of the window structure and then positioning the second one of the pair of brackets so that the thick edge thereof is not in juxtaposition to the thick edge of the other bracket when the pair of brackets are both positioned in the window structure.

In greater detail, the method of this invention teaches the cutting of the glass ribbon into a plurality of glass brackets, each of which brackets has a taper from a thick edge thereof to an opposing, thin edge thereof. The thick edge of each of the plurality of glass brackets is identified either by a suitable sticker or by the manner in which the glass is packaged. In a subsequent assembly operation, the thick edges of the two brackets utilized to form the window structure are positioned on opposite sides of the frame of the window structure.

With such a method of manufacturing these window structures, a glass manufacturer does not have to make two separate runs to produce glass of two different thicknesses. The glass manufacturer need make only a single run of float glass having a tapering thickness. The tapered float glass may be cut from the ribbon to form individual brackets, immediately packaged in some way which will identify the thick edge of each bracket and thereafter shipped directly to the glass fabricator. The glass fabricator then has only to remove the brackets from the package and position alternate sheets so that their thick edges are not in juxtaposition in the window frame of the structure.

The window structure produced in accordance with the teachings of the method of this invention is one which eliminates the fringes observed when two sheets of uniform thickness of float glass are utilized in the manufacture of a dual bracket window structure. The window structures manufactured in accordance with the method of this invention do not have the resulting interference fringe problem. Such a structure, therefore, is more popular with fabricators and their customers because the objectionable fringe problem is overcome and not complained about by the customers.

DESCRIPTION OF THE PREFERRED EMBODIMENT

General

In the last few years the float process of manufacturing flat glass has become extremely popular. This process produces a glass ribbon of substantially uniform thickness which exhibits superior surface characteristics in that the surfaces of the ribbon are fire-polished to an extremely smooth finish. In the manufacture of flat glass by the float process, molten glass is flowed out upon a molten bath and while in contact with the bath, the glass is cooled to a temperature whereat the glass is substantially self-supporting. During the cooling of the glass, the glass will assume a condition wherein the thickness of the glass across the width thereof is substantially uniform and equal. The process of manufacturing float glass nearly always includes a stretching operation while the glass is plastic and in contact with the float bath. This stretching operation reduces glass thickness below that which occurs naturally as a result of equilibrium between buoyant forces and surface tension forces.

Float glass has become extremely popular in the glazing industry for the production of all shapes and sizes of window structures. This glass has found wide acceptance because the glass exhibits superior surface qualities which eliminate distortion when viewing an object therethrough. Also, this glass is substantially free of surface irregularities of such magnitude as cause visible distortion of objects viewed through it. One particular type of window structure which is made from float glass is the thermal window wherein a pair of spaced and substantially parallel glass brackets are mounted in a window frame. Such a window structure may be utilized as a closure element for a building, and there is generally no need of placing a storm window in front of the window structure during cold weather.

In past practice, when thermal window structures have been constructed by utilizing glass manufactured by the float process, a window structure having superior characteristics was achieved. However, certain unanticipated difficulties with the window structures constructed with float glass were sometimes encountered. More particularly, when light incident upon the window was viewed under particular conditions, the viewer's eye observed many iridescent marks in the window structure which could characteristically be described as a wood-grain or an oil stain appearance.

Figure 1:
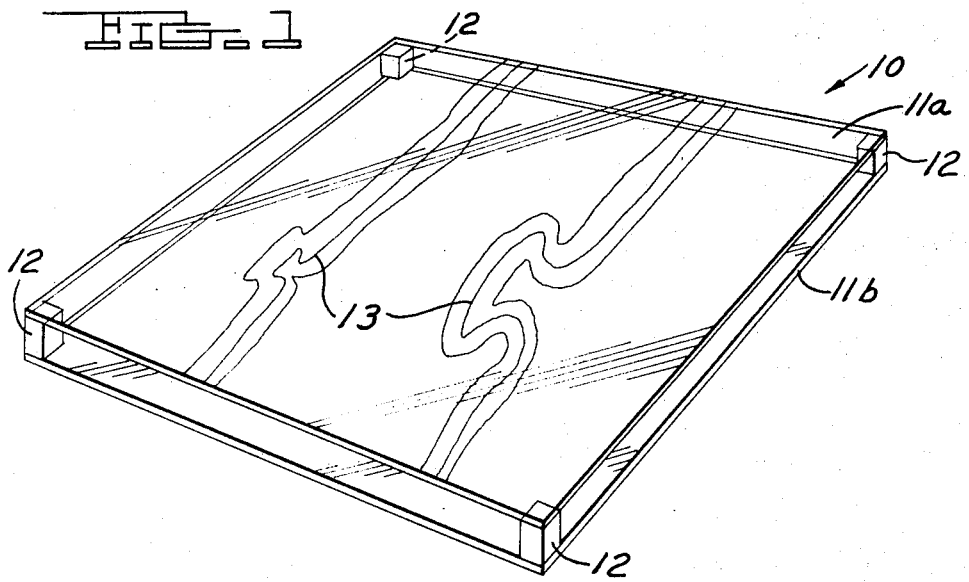
FIG. 1 is an isometric view showing an illustration of the occurrence of interference fringes hereinafter called Jamin fringes in the upper one of a spaced pair of parallel glass brackets which have uniform and equal thickness.
Figure 2:
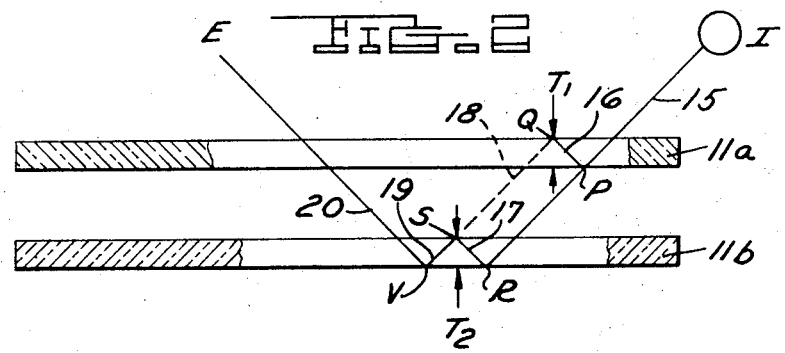
FIG. 2 is an illustration of the manner in which the Jamin fringes are developed, the illustration not taking into account the angles of incidence and refraction and secondary rays of light.

The iridescent marks in the thermal window structure formed by two pieces of uniformly thick float glass can best be understood by reference to FIGS. 1 and 2 of the associated drawings. In FIG. 1 a thermal window structure, generally designated by the numeral 10 is shown as being formed of two glass brackets 11a and 11b. Each bracket is of uniform thickness and is substantially identical in thickness to the other bracket. This uniformity in thickness would occur in the normal construction of such a window structure because adjacent, or almost adjacent, glass brackets cut from a continuous ribbon of glass would be utilized to construct the window structure. Adjacent brackets would be utilized because of the manner in which glass manufacturers package and ship the brackets to glass fabricators. The uniformity in thickness and the continued uniformity in thickness between the brackets of glass cut from a glass ribbon is a characteristic of the float process. In FIG. 1 a plurality of spacing blocks 12, representative of window frame, are shown for holding the glass brackets 11a and 11b in spaced, substantially parallel relationship.

When white light is projected onto the upper surface of window structure 10 and the structure is mounted against a dull background, iridescent patterns of fringes 13 are visible in the structure 10. The fringes 13, as schematically represented in the drawing of FIG. 1, cover the full spectrum of light. While the fringes are not vivid, the colors are observable and are, therefore, irritating to a person who has paid for the structure. Three varieties of white light are defined in scientific work and are known as illuminants A, B and C. These were first defined in an article by D. B. Judd, "The I. CI. Standard Observer and Coordinate System for Colorimetry" in the Journal of the Optical Society of America, volume 23, pp. 359–364.

The fringes observed in the window structure are of the type identified as Jamin fringes. The production of Jamin fringes occurs, as any other type of fringe, when a pair of optical path lengths through the glass window structure are substantially identical. The Jamin fringes are distinguished from the other fringes by the following: (1) all four surfaces of the two glass brackets are involved, and (2) the path lengths of the beams in each bracket are identical in length. The paths of the two beams are thus symmetrically disposed relative to one another within the two brackets. It is this symmetry which makes the Jamin fringes sensitive to the differences in thickness of the glass brackets. For example, with reference to FIG. 2 a ray of light is shown which produces the Jamin fringe in a construction such as the glazing unit of FIG. 1. In FIG. 2 the effects of refraction and secondary light rays have been omitted for the purpose of clarity although it is obvious to one skilled in the art that refraction and secondary rays would occur. The Jamin fringes are quite sensitive to the equality of the thicknesses of the two glass brackets 11a and 11b and are quite tolerant to the angle between the two glass brackets. Thus, if the two glass brackets are not exactly parallel to one another, the Jamin fringes can still occur as long as the two brackets are of equal and uniform thickness. The interference fringes are referred to as Jamin fringes because of the similarity of their origin to that of the fringes produced by a Jamin interferometer; see Jenkins and White, Fundamentals of Optics, 3rd. ed., New York, McGraw Hill Inc., 1959, page 257.

With reference to FIG. 2, the Jamin fringes are produced when the beam of light 15 from the light source I passes into the first bracket 11a to the point P, at which point a portion of the light beam is deflected to generate a new beam of light 16 and a portion of the light passes onto the second bracket 11b. Another portion of the beam 15 is reflected at point R in the bracket 11b to generate a second new beam of light 17. The new beams of light 16 and 17 are again reflected at points Q and S, respectively, to generate new beams 18 and 19, respectively, the beam 18 being shown as a dotted line.

The thicknesses T1 and T2, respectively of the brackets 11a and 11b, are substantially equal within a few lightwave lengths of one another and the angle between the two brackets is approximately 180°. Under these conditions, the beam 18 will fall upon the beam 19 and both will be reflected at point V to produce a new beam 20 which is observed by an observer from point E. Interference results from the wave properties of light. When light waves from a single source, or two mutually coherent sources, reach the eye (or other suitable detector) in the same phase, they reinforce; when their phases are opposite, they annul one another, wholly or partially. Interference fringes are seen when the phase relationship of two coherent beams of light alternate in adjacent regions, producing alternately reinforcement and annulment. Each fringe is the geometrical locus of a constant phase relationship between the two beams. White light is coherent only for path differences of about .0001 inch. The Jamin fringe occurs, then, when the optical path length from PRS is essentially equal to the optical path length PQS whereby the beams of light come together to form a new beam.

Thus, the highly desirable characteristic of the float glass, namely, its uniform thickness over extended lengths, results in the production of a thermal window structure which shows interference fringes against certain backgrounds and light conditions. While the interference fringes are not severe, they are annoying to one who has paid for the structure. The average customer considers that a window structure which produces such interference fringes has not been properly manufactured. Even though a customer does have a superior glass structure in many ways, he is generally dissatisfied with the structure because of the interference fringes which are visible.

METHOD OF FORMING WINDOW STRUCTURES

The interference fringes of the Jamin type can be eliminated by making the two sheets utilized in glazing the thermal window structure of two different thicknesses. By varying the thickness of the glass in juxtaposed areas of the structure, the optical path lengths through the glass structure are varied and the generated rays do not recombine as is depicted in FIG. 2.

Here, however, the problem is that the glass manufactured in a particular float glass installation has a substantially uniform thickness along substantial length of the ribbon. A variation in thickness of the glass ribbon sufficient to eliminate the Jamin type fringes would occur in the glass ribbon only over substantial lengths of the ribbon, for example, four to five miles of the ribbon. Thus, in order to obtain two thicknesses of glass it would be necessary for a glass manufacturer to make a glass ribbon of one thickness, cut brackets from the ribbon and store the cut brackets for a period of time. At a subsequent time the glass manufacturer would produce a further length of glass ribbon with a second thickness different from the first thickness, cut that ribbon into brackets and store the cut brackets. At a subsequent time, the two sets of glass brackets cut from the different thickness glass ribbons could be intermingled in a packaging operation so that every other bracket in a crate would have a different thickness. The crate could then be shipped to a fabricator of thermal window structures and he could draw adjacent sheets from the crate to form a window structure which would not have the Jamin interference fringe problem. The trouble encountered with this approach of eliminating the Jamin fringe problem is that substantial amounts of space are necessary for the glass manufacturer to store both the glass brackets cut from the glass ribbon of one thickness and then the glass brackets cut from the glass ribbon of the second thickness. The glass manufacturer would also have additional handling and operational costs involved in the intermixing and interpacking of brackets of the various thicknesses.

In accordance with the preferred teachings of the method of this invention, a thermal window structure is formed by utilizing float glass brackets which have a taper therein from a thick edge to a thin edge thereof. Such a method requires that the glass manufacturer produce only one glass ribbon with a taper therein, and the window structure produced therefrom does not have the Jamin fringe problem.

A method of manufacturing float glass having a tapering thickness from one edge thereof to the other edge thereof is described and claimed in copending patent application S.N. 756,439, filed Aug. 30, 1968, and assigned to the same assignee as this application. Briefly, in the method described in that application, molten glass is allowed to flow out upon a molten bath and is processed on the bath to obtain a taper across the width thereof by controlling the temperature in certain portions of the glass ribbon while lateral stretching forces are applied thereto. Molten glass is initially flowed out upon the bath and cooled to become a semi-rigid ribbon of glass. Thereafter, the glass ribbon is reheated but to varying degrees across the width thereof. When the lateral stretching forces are applied to the glass, the cooler portion of the glass is attenuated or stretched more than the hotter portions of the glass thereby forming a taper across the width of the glass ribbon. The taper formed in the glass ribbon has an angle of about one minute or arc. For further details of the process of making tapered float glass, reference is made to the mentioned application.

Float glass manufactured by a process so as to produce a taper in the glass is cut into a plurality of glass brackets by glass cutting apparatus as already known in the art. Each bracket, so formed, has a taper therein across its width from a thick edge thereof to a thin edge thereof. The glass brackets are stacked in crates or other glass bracket handling apparatus in a manner that identifies the respective edges of the bracket. For example, all of the thick edges of the brackets are stacked so that they face in a particular direction within the packing crate and that direction is marked on the outside of the packing crate. On the other hand, tags may be applied to either the thick edge or the thin edge of the glass to identify the same. It should be noted that by employing the method of this invention, it is not necessary for the glass manufacturer to store glass brackets of two thicknesses because in this method, individual glass brackets coming from contiguous areas of the glass ribbon may be cut and immediately packed in the packing crates for shipment to the glass fabricator.

Figure 3:
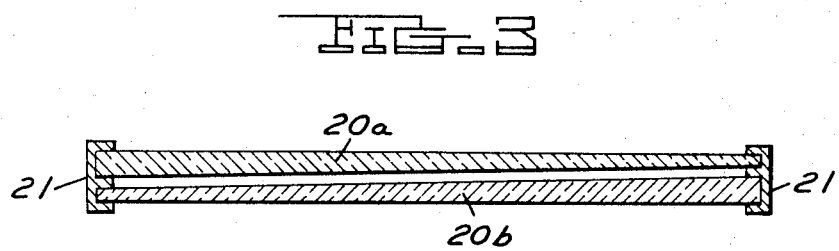
FIG. 3 is an illustration of a window structure formed in accordance with the teachings of the method of this invention.

The fabricators assemble the individual window structures by placing a first glass bracket with its thick edge on one side of the window frame and thereafter placing the next glass bracket with its thick edge in the opposite side of the frame whereby the two glass brackets have a reversed taper. More particularly, as illustrated graphically in FIG. 3, the upper tapered glass bracket 20a has its thick edge to the left of the frame member 21 while the lower bracket 20b has its thick edge to the right. While the normal taper of the glass is about one minute of arc, the taper of the glass brackets is over-emphasized in the figure to show that the juxtaposed areas of glass have substantialy different thicknesses except for a very small central portion thereof. Such differences in thickness eliminate the Jamin fringe problem in the window structure except for a very small central portion thereof where the fringes are inconspicuous to the unaided eye. Such a structure permits the utilization of the superior surface finish obtained on the float glass while eliminating the objectionable fringe problem in the thermal window construction. In the formation of a thermal window structure, the thick edges of the two glass brackets should not be at the same side of the window frame. If such was the case the thickness of the brackets in juxtaposed areas of the structure would be identical and, therefore, the Jamin fringes could occur.

The foregoing description presents the presently preferred embodiment of this invention. Modifications and alterations may occur to those skilled in the art that will come within the scope and spirit of the following claims.

What is claimed is:

1. A method of making a glass window structure which comprises:
    manufacturing a ribbon of glass by flowing molten glass out upon a molten bath to form the glass ribbon and processing the glass ribbon on the bath to obtain a taper therein across the width thereof;

cutting the glass ribbon into at least a pair of glass brackets, each of the glass brackets having a taper therein from a thick edge thereof to an opposing, thin edge thereof; and assembling a glass window structure from the brackets by positioning the thick edge of one of the brackets at one side of the frame of the window structure and thereafter positioning the second bracket so that the thick edge thereof is not in juxtaposition to the thick edge of the first bracket when the pair of brackets are positioned in the frame of the window structure.

2. The method of making a glass window structure as defined in claim 1 wherein said pair of brackets are assembled so that the thick edge of one of the brackets is on the opposite side of the frame of the window structure from the thick edge of the other bracket when the pair of brackets are positioned in the frame of the window structure.

3. A method of making a glass window structure which comprises:

manufacturing a ribbon of glass by flowing molten glass out upon a molten bath to form the ribbon of glass and processing the glass ribbon on the bath to obtain a taper therein across the width thereof;

cutting the glass ribbon into a plurality of glass brackets, each of the brackets having a taper from a thick edge thereof to an opposing, thin edge thereof; and assembling individual glass window structures from said brackets by positioning the thick edge of one of the brackets at one side of the frame of the window structure and thereafter positioning a second one of the brackets so that the thick edge thereof is at the side of the frame of the window structure opposite the thick edge of the first bracket positioned in the window structure.

4. A method of making a plurality of glass window structures which comprises:

manufacturing a ribbon of glass by flowing molten glass out upon a molten bath to form the ribbon of glass and processing the glass ribbon on the bath to obtain a taper therein across the width thereof;

cutting the glass ribbon into a plurality of glass brackets, each of the glass brackets having a taper from a thick edge thereof to an opposing, thin edge thereof;

identifying the thick edge of each of the plurality of the glass brackets; and assembling individual glass window structures from the brackets by positioning the thick edge of one of the brackets at one side of the frame of the window structure and thereafter positioning a second one of the brackets so that the thick edge thereof is at the side of the frame of the window structure opposite the thick edge of the first bracket positioned in the frame of the window structure.

5. The method of making a plurality of glass window structures as defined in claim 4 wherein the thick edge of the glass brackets are identified by positioning each of the plurality of glass brackets in a container with the thick edges of the brackets in juxtaposition to one another.

6. The method of making a plurality of glass window structures as defined in claim 4 wherein the thick edges of the plurality of glass brackets are identified by placing a mark on a selected edge of each bracket which identifies the location of the thick edge of the bracket.

References Cited

UNITED STATES PATENTS 3,506,425  4/1970  Currie _____ 65—62

S. LEON BASHORE, Primary Examiner

SAUL R. FRIEDMAN, Assistant Examiner

U.S. Cl. X.R.

65—58, 65, 97, 99, 112, 182; 156—99; 161—192